(12) United States Patent
Beard et al.

(10) Patent No.: US 8,140,013 B1
(45) Date of Patent: **\*Mar. 20, 2012**

(54) WIRELESS COMMUNICATION DEVICE AND METHOD

(75) Inventors: Paul Beard, Milpitas, CA (US); David Wright, San Diego, CA (US)

(73) Assignee: Cypress Semiconductor Corporation, San Jose, CA (US)

( \* ) Notice: Subject to any disclaimer, the term of this patent is extended or adjusted under 35 U.S.C. 154(b) by 672 days.

This patent is subject to a terminal disclaimer.

(21) Appl. No.: 12/239,602

(22) Filed: Sep. 26, 2008

Related U.S. Application Data

(63) Continuation-in-part of application No. 11/027,005, filed on Dec. 30, 2004, now Pat. No. 7,848,703, and a continuation-in-part of application No. 10/859,675, filed on Jun. 2, 2004, now abandoned.

(60) Provisional application No. 60/476,530, filed on Jun. 4, 2003, provisional application No. 60/976,398, filed on Sep. 28, 2007.

(51) Int. Cl.
*H04B 7/00* (2006.01)
*H04B 7/24* (2006.01)

(52) U.S. Cl. ......... 455/41.2; 455/41.3; 455/39; 455/522

(58) Field of Classification Search ................ 455/41.2, 455/41.3, 39, 522, 422.1, 461, 465, 420, 455/410, 411, 566; 380/247, 270; 713/168, 713/151, 2; 725/35; 340/573.1
See application file for complete search history.

(56) References Cited

U.S. PATENT DOCUMENTS

| | | | |
|---|---|---|---|
| 5,680,102 A | 10/1997 | Xydis | |
| 5,900,806 A | 5/1999 | Issa et al. | |
| 5,955,700 A | 9/1999 | Slipy et al. | |
| 6,238,338 B1 | 5/2001 | DeLuca et al. | |
| 6,615,301 B1 | 9/2003 | Lee et al. | |
| 6,690,056 B1 | 2/2004 | Reedy et al. | |
| 6,708,288 B1 | 3/2004 | Ziegler et al. | |
| 6,741,178 B1 | 5/2004 | Tuttle | |
| 6,765,363 B2 | 7/2004 | LaFollette et al. | |
| 6,823,186 B2 | 11/2004 | Salokannel et al. | |
| 6,956,480 B2 | 10/2005 | Jespersen | |
| 6,961,541 B2 | 11/2005 | Overy et al. | |
| 6,970,183 B1 | 11/2005 | Monroe | |
| 7,026,983 B2 | 4/2006 | Spratt | |
| 7,072,615 B1 | 7/2006 | Todd | |
| 7,142,814 B2 | 11/2006 | Nassimi | |
| 7,173,990 B2 \* | 2/2007 | Kim et al. ..................... 375/347 |
| 7,174,130 B2 | 2/2007 | Kurisko | |
| 7,209,705 B2 | 4/2007 | Moles et al. | |
| 7,379,447 B2 | 5/2008 | Dunagan et al. | |
| 7,848,703 B1 \* | 12/2010 | Beard et al. .................. 455/41.2 |
| 2001/0049740 A1 | 12/2001 | Karpoff | |
| 2003/0006737 A1 | 1/2003 | LaFollette et al. | |
| 2003/0063003 A1 | 4/2003 | Bero et al. | |
| 2003/0073461 A1 | 4/2003 | Sinclair | |

(Continued)

OTHER PUBLICATIONS

USPTO Notice of Allowance for U.S. Appl. No. 11/027,005 dated Jan. 28, 2009; 14 pages.

(Continued)

*Primary Examiner* — Eugene Yun (57) ABSTRACT

A wireless communication device and associated method is described. The device includes a radio and a controller to operate the radio in a normal communications range responsive to the controller binding the radio to a host in a reduced binding range, where the radio and the controller are integrated into a single chip.

20 Claims, 6 Drawing Sheets

U.S. PATENT DOCUMENTS

| | | | |
|---|---|---|---|
| 2003/0138941 | A1 | 7/2003 | Gong et al. |
| 2003/0151600 | A1 | 8/2003 | Takeuchi et al. |
| 2003/0178395 | A1 | 9/2003 | Duignan |
| 2003/0190906 | A1 | 10/2003 | Winick |
| 2004/0107435 | A1 | 6/2004 | Anzai et al. |
| 2004/0130446 | A1 | 7/2004 | Chen et al. |
| 2004/0139110 | A1 | 7/2004 | LaMarca et al. |
| 2004/0176032 | A1 | 9/2004 | Kotola et al. |
| 2005/0048919 | A1 | 3/2005 | Jeannerod |
| 2005/0064814 | A1 | 3/2005 | Matsuo et al. |
| 2005/0266798 | A1 | 12/2005 | Mololey et al. |
| 2005/0282588 | A1 | 12/2005 | Linjama et al. |
| 2005/0287950 | A1 * | 12/2005 | Helden et al. ............... 455/41.2 |
| 2006/0035590 | A1 | 2/2006 | Morris et al. |
| 2006/0053276 | A1 | 3/2006 | Lortz et al. |
| 2006/0105712 | A1 | 5/2006 | Glass et al. |
| 2006/0149963 | A1 | 7/2006 | Lu et al. |
| 2006/0183462 | A1 | 8/2006 | Kolehmainen |
| 2006/0199536 | A1 | 9/2006 | Eisenbach |
| 2006/0234630 | A1 | 10/2006 | Lai |
| 2007/0093207 | A1 | 4/2007 | Kim |

OTHER PUBLICATIONS

USPTO Final Rejection for U.S. Appl. No. 11/027,005 dated Nov. 5, 2008; 14 pages.

USPTO Non-Final Rejection for U.S. Appl. No. 11/027,005 dated May 15, 2008; 13 pages.

USPTO Final Rejection for U.S. Appl. No. 11/027,005 dated Nov. 1, 2007; 20 pages.

USPTO Non-Final Rejection for U.S. Appl. No. 11/027,005 dated May 14, 2007; 12 pages.

USPTO Non-Final Rejection for U.S. Appl. No. 10/859,675 dated Nov. 19, 2007; 7 pages.

USPTO Requirement for Restriction/Election for U.S. Appl. No. 10/859,675 dated Apr. 19, 2007; 3 pages.

USPTO Advisory Action for U.S. Appl. No. 10/859,675 dated Jan. 12, 2007; 3 pages.

USPTO Final Rejection for U.S. Appl. No. 10/859,675 dated Nov. 2, 2006; 8 pages.

USPTO Non-Final Rejection for U.S. Appl. No. 10/859,675 dated Jul. 12, 2006; 8 pages.

USPTO Final Rejection for U.S. Appl. No. 10/859,675 dated May 26, 2009; 7 pages.

USPTO Non-Final Rejection for U.S. Appl. No. 12/962,608 dated Apr. 1, 2011; 23 pages.

U.S. Appl. No. 12/962,608: "Method and Apparatus for Binding Wireless Devices," Beard et al., filed on Dec. 7, 2010; 24 pages.

USPTO Notice of Allowance for U.S. Appl. No. 11/027,005 dated Jul. 27, 2010; 11 pages.

USPTO Non-Final Rejection for U.S. Appl. No. 11/027,005 dated Feb. 16, 2010; 10 pages.

USPTO Notice of Allowance for U.S. Appl. No. 11/027,005 dated Oct. 28, 2009; 13 pages.

USPTO Notice of Allowance for U.S. Appl. No. 11/027,005 dated May 13, 2009; 13 pages.

U.S. Appl. No. 13/287,521: "Method and Apparatus for Binding Wireless Devices," Beard, et al., filed on Nov. 2, 2011; 29 pages.

USPTO Non-Final Rejection for U.S. Appl. No. 13/287,521 dated Dec. 7, 2011; 14 pages.

* cited by examiner

WIRELESS COMMUNICATION DEVICE AND METHOD

CROSS-REFERENCE TO RELATED APPLICATIONS

This application claims the benefit of U.S. Provisional Application No. 60/976,398, filed Sep. 28, 2007. This application is a continuation-in-part of U.S. patent application Ser. No. 10/859,675, filed Jun. 2, 2004 now abandoned, which claims the benefit of U.S. Provisional Application No. 60/476,530 filed Jun. 4, 2003. This application is also a continuation-in-part of U.S. patent application Ser. No. 11/027,005, filed Dec. 30, 2004 now U.S. Pat. No. 7,848,703.

TECHNICAL FIELD

Embodiments of this invention relate to computer systems and, more particularly, to a wireless communication device and associated method.

BACKGROUND

In the past, alarm sensors and various types of actuators have generally been hard wired to control panels. Signals from the sensors were received at the control panel and distributed as required. Control signals were also transmitted to the devices from the control panel as required. For example, in home, office, and industrial environments, sensors such as smoke alarms, motion detectors, floor sensors and other types of sensors have been typically hard wired to a central control panel. At the central control panel the sensors are monitored and some appropriate pre-established action is taken when the sensor is actuated. For example, a particular light or alarm siren may be turned on when a sensor is actuated or an alarm may be sent to the police or fire department.

Recently, various wireless technologies have been coming into widespread use in the computer industry. Among the wireless technologies that have come into widespread use are technologies such as the widely known as IEEE 802.11 technology and the technology known as "Bluetooth". Various proprietary wireless technologies are also in widespread use.

In general, it is frequently more economical and less time consuming to connect sensors to a control panel using a wireless technology than it is to connect the sensors to a control panel using hard wires. The process of placing and routing wire through a building is expensive and time consuming and it can present aesthetic issues. On the other hand a wireless link from a sensor to a control panel can usually be implemented in a time and cost effective manner.

In contrast with wired devices, wireless devices are not physically connected to another wireless device, such as the host computer. Therefore, many wireless devices may be paired to a host to create a "virtual cable." During the "pairing" or "binding" process, two wireless devices agree upon parameters to be used for transmitting information so that each device can confirm it is receiving data from the other remote wireless device.

Some pairing or binding methods require the use of buttons which add cost and complexity to the device. Other methods require users to identify a device to be paired from a number of devices, which can add complexity to the pairing process. Thus, the implementation of existing pairing methods in a wireless device often results in an increase in the cost and number of components used in the device. Existing pairing methods may also require a user to perform many steps, which can be cumbersome, particularly if the user is unfamiliar with the pairing process or if many devices need pairing.

BRIEF DESCRIPTION OF THE DRAWINGS

The above described and various other features and advantages of the present invention will become more apparent by the following description, which provides details of exemplary embodiments thereof with reference to the attached drawings in which.

DETAILED DESCRIPTION

Described herein is a method and apparatus for establishing a wireless link between devices. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the spirit and scope of the present invention.

Embodiments of the present invention provide a system that includes a wireless link that can be used for devices such as sensors, cameras and actuators. The wireless link has high noise immunity, operates at high speed, can carry real time data such as camera images, and can connect sensors or actuators to the Internet. Embodiments of the present invention provide a wireless interface to industrial devices such an industrial device network may be rapidly installed in an existing building.

Figures 1, 2:
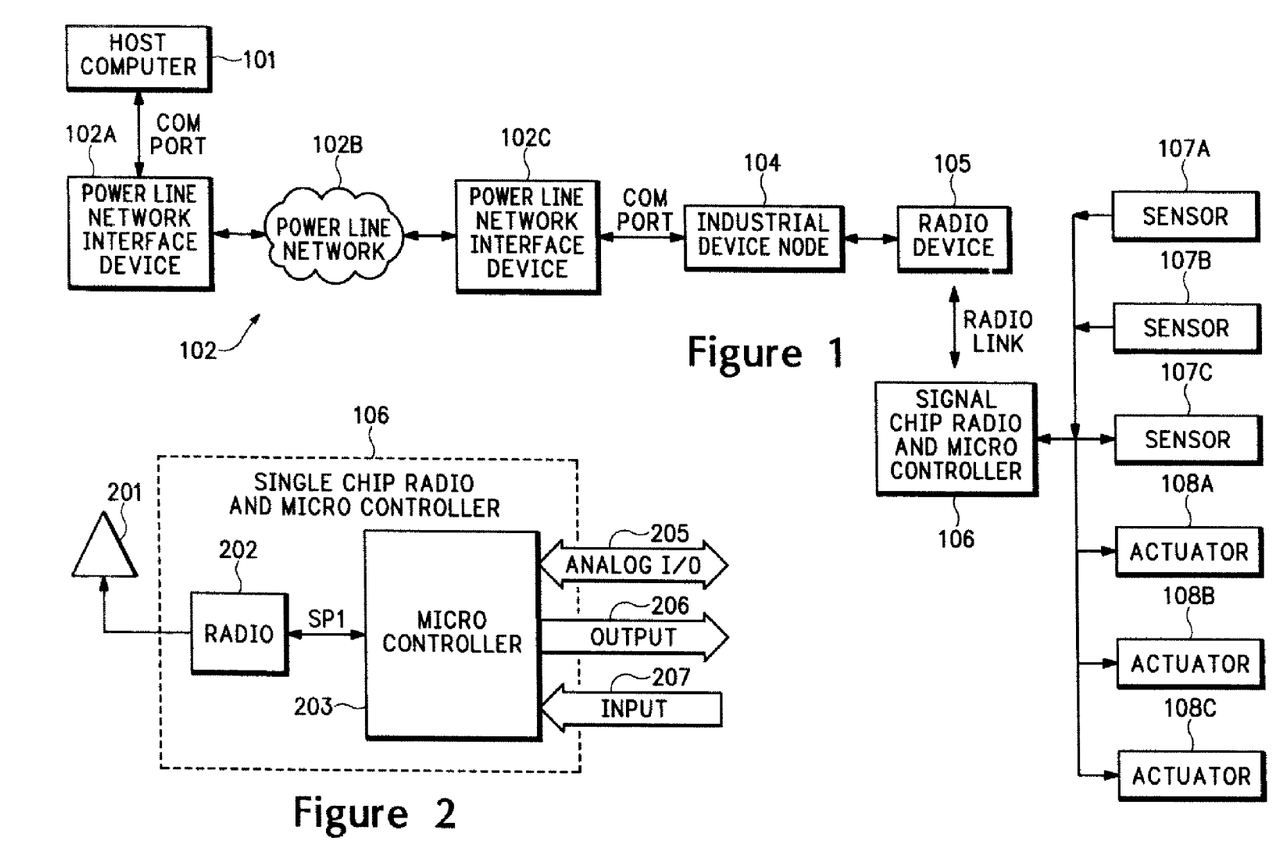
FIG. 1 is a block diagram of an embodiment of a system that connects sensors and actuators to a host computer.
FIG. 2 is a block diagram of an embodiment of a single chip radio and micro controller.

FIG. 1 is an overall block diagram of one embodiment of a system that connects a plurality of sensors 107 and actuators 108 to a host computer 101. Host computer 101 may be a stand alone computer such as, for example, a personal computer. Furthermore, it may be connected to the Internet through a connection that is not specifically shown in the drawing.

It should be understood that while only three sensors 107A, 107B and 107C are shown in FIG. 1, in general, many systems may include a large number of such sensors. Stated differently, sensors 107A, 107B and 107C are merely representative and in most specific applications there may be a plurality of such sensors.

Furthermore, only two actuators 108A and 108B are shown in FIG. 1; however, the system may include many such actuators. Actuators may perform a wide variety of functions, for example, the actuators may be devices that turn on a siren or turn on a warning light.

The overall function of the system is to connect sensors 107 and actuators 108 to host 101. The system includes a power line interface network 102, an industrial device node 104, a radio transmitter-receiver 105, and a single chip radio and a micro controller 106. The power line network 102 includes network interfaces 102A and 102C that communicate through a power line network 102B.

The radio link from the single chip radio and micro controller 106 to radio device 105 merely transmits the data from the sensors 107 and actuators 108 to the radio 105, which is then transmitted to the industrial device node 104. Commands can also be transmitted back to the actuators 108 or to sensors 107 via this radio link.

FIG. 2 is a block diagram of the single chip radio and micro controller 106. The single chip radio and micro controller 106 includes a radio transmitter-receiver 202 and a programmable micro controller 203, which reside on a common carrier substrate. The common carrier substrate may be, for example, an integrated circuit (IC) die substrate, a multi-chip module substrate, or the like. However, for ease of discussion, the term "single chip" may hereinafter be used to indicate that these components reside on a common carrier substrate.

It is noted that the single chip radio and micro controller 106 provides bi-directional communication with sensors 107 and actuators 108. That is, the single chip radio and micro controller 106 both (1) receives data from sensors 107 and transmits the data to radio 105 and (2) receives commands from radio 105 and transmits these commands to the sensors 107 or to actuators 108. For example, if the sensor 107 is a camera, images would be sent from the camera to single chip radio and micro controller 106 and commands could be sent from the single chip radio and micro controller to the camera to instruct the camera to change its direction of view.

Microcontroller 203 can, for example, be the microcontroller developed by Cypress Semiconductor Corporation of San Jose, Calif. under the trademarks Programmable System-on-Chip™ and PSoC™. The Programmable System-on-Chip microprocessor is a true System-on-Chip. The PSoC™ is a high-performance, field-programmable, mixed-signal array suitable for embedded-control functions in consumer, industrial, office automation, telecom and automotive applications. The PSoC™ device provides highly stable, instrumentation quality analog performance, including rail-to-rail inputs; programmable gain; and 14-bit analog-to-digital converters (up to four independent converters are available in a single PSoC™ device). The Cypress Semiconductor Corporation PSoC™ has low noise, low input leakage and low voltage offset, and it has an 8-bit micro controller core. In various other embodiments various other types of micro controllers can be used.

The micro controller 203 has analog input-output 205, data output channel 206 and data input channel 207. The input output channels 205, 206 and 207 can be connected to sensors such as sensors 107 and actuators 108. The radio 202 can be a normal state of the art radio transmitter receiver. Radio 202 has an associated antenna 201.

The industrial device node 104 shown in FIG. 1 can be a commercially available industrial device node. In one embodiment, for example industrial device node 104 may include the type of microcontroller developed by Cypress Semiconductor Corporation of San Jose, Calif. under the trademark Neuron®. The Neuron® chips marketed by Cypress may be commercially available under the designations CY7C53120L8 and CY7C53150L.

The Neuron® micro controller is a 3.3 volt microcontroller that has been optimized for control networking applications. The low power specification, increased I/O performance and higher memory integration makes this micro controller suitable for use for collecting data from sensors and actuators and for reporting such data.

The difference between the CY7C53120L8 and CY7C53150L is that the CY7C53120L8 has 16 Kbyte of ROM, 4 Kbyte of RAM and 8 Kbyte of internal EEPROM. On the other hand, the CY7C53150L has 4 Kbyte of RAM and 2.7 Kbyte of EEPROM. Both devices feature three 8 bit pipelined processors that enable concurrent processing of application code and network traffic at speeds of up to 20 MHz. Both the CY7C53120L8 and CY7C53150L have a hardware-based serial communications interface (UART) and serial peripheral interface (SPI) engine that is scalable to 2.5 Mbit/s, and a programmable low voltage inhibitor (LVI). Both devices have in-system programming via an 11-pin configurable I/O block and a flexible five-pin communications port that can be configured to interface with a variety of 5 and 3.3V media transceivers over a wide range of data rates.

The particular industrial device node chosen for any particular specific application depends upon the specific engineering specifications of the particular application. Different specific embodiments would use different industrial device nodes. In addition to the specific industrial device node described above, in other embodiments other industrial device nodes by other manufacturers can be used.

The power line network 102 can consist of commercially available components. Two of the companies that market such components are Intelogis Technologies Inc., located in Draper, Utah, and Intellon Inc. located in Ocala, Fla. Intellon markets a power line network technology under the trademark PowerPacket. The Intellon power line network uses an enhanced form of orthogonal frequency-division multiplexing (OFDM). The power line networking system marketed by Intellon utilizes forward error-correction to minimize errors. It is noted that OFDM is a variation of the frequency-division multiplexing (FDM) used in phone line networking and in technology found in DSL modems.

OFDM divides the available range of frequencies which includes frequencies in the range 4.3 MHz to 20.9 MHz, into 84 separate carriers. OFDM sends packets of data simultaneously along several of the carrier frequencies, allowing for increased speed and reliability. If noise or a surge in power usage disrupts one of the frequencies, the PowerPacket chip may sense such a disruption and switch that data to another carrier. This rate-adaptive design allows PowerPacket to maintain an Ethernet-class connection throughout the power-line network without losing any data.

Figure 3:
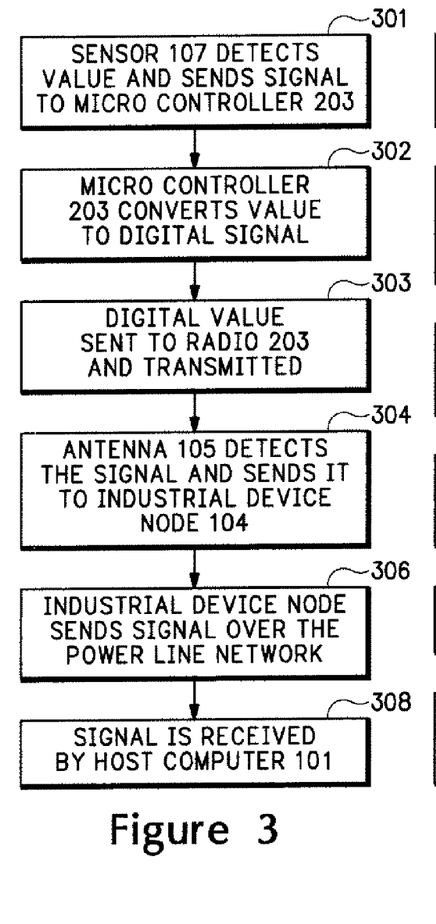
FIG. 3 is a flow diagram showing the operation of the system that connects sensors and actuators to a host computer, according to one embodiment.

FIG. 3 is a block flow diagram illustrating the operation of the system. That is, FIG. 3 indicates how data is transmitted from sensors 107 to computer 101. As indicated by block 301, data from the sensors 107 is sent to the microcontroller 203. This data can either be transmitted on analog I/O 205 if the sensors 107 provide analog data or the data from the sensors 107 can be provided to microcontroller 203 as digital data on input 207. Which input channel is connected to the sensor depends on the particular characteristics of the particular sensor 107.

If the input signal is in the form of an analog signal, an analog to digital converter that is part of micro controller 203

(but which is not explicitly shown in the drawing) converts the analog signal to a digital signal. This is indicated by block 302.

The digital signal which indicates a value from sensors 107 is transferred to radio 202 and transmitted over the air. Since radio 202 and micro controller 203 are on a single chip, the transmission from micro controller 203 to radio 202 can be done on a bus that is internal to the chip. In this embodiment, they are connected by a Serial Peripheral Interface (SPI) bus. It is noted that the PSoC™ from Cypress Semiconductor Corporation, which was described above, includes an SPI bus. SPI is a standard parallel Small Computer System Interface (SCSI) type of bus. Thus, data can be transferred at a high rate of speed.

As indicated by block 304, the signals are received by radio transmitter/receiver 105. From radio transmitter/receiver 105, the signals are transmitted to industrial device node 104.

Next, as indicated by block 306, the industrial device node 104 sends the signals over the over line network 102. That is, the industrial device node 104 sends the signals to power line interface device 103C, which in turn transmits the signals over the power line network. The signals are in turn detected by power line network interface device 102A.

Finally, as indicated by block 308, the signal is received by the host computer 101. The host computer 101 may be a personal computer or it may be some other type of network computer. The computer 101 may in turn be connected to the Internet.

Figure 4:
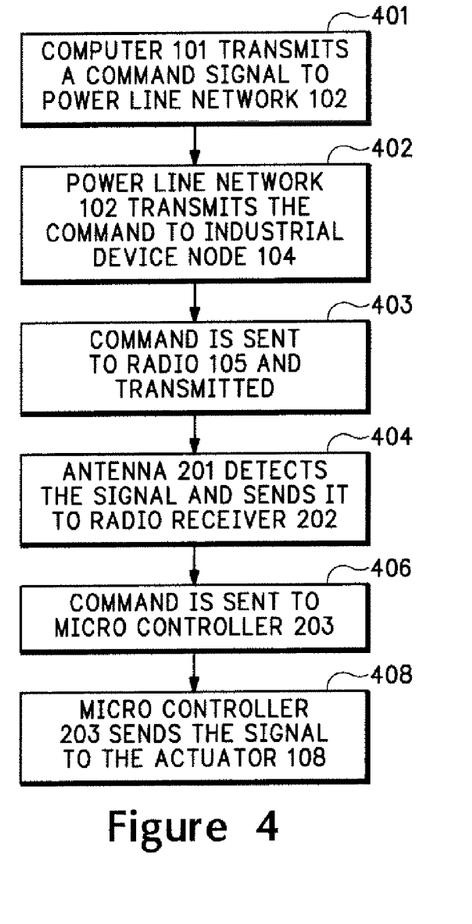
FIG. 4 is a block flow diagram showing how a command is sent to a sensor according to one embodiment.

FIG. 4 illustrates how data is sent from computer 101 to actuators 108. As indicated by block 401, the computer 101 transmits a command to power line network 102.

As indicated by block 402, the command is transmitted through the power line network 102, that is, the command goes from interface device 102A, through the network 102B, and then to power line network interface 103C. After passing through the power line network 102, the command may arrive at industrial device node 104.

The industrial device node 104 sends the command to radio transmitter 105, which transmits the command over the air as indicated by block 403. The command is received by antenna 201 and sent to radio receiver 202 as indicated by block 404.

From radio receiver 202, the command is sent to micro controller 203 as indicated by block 406. The micro controller 203 in turn sends the command to actuator 108 as indicated by block 408.

It should be noted that both micro controller 203 and industrial device node 104 are programmable device. These programmable devices can include programs that detect a particular sequence of signals from sensors 107 and possible from external sources such as from a timer or manual switch. When a particular pre-established sequence is detected these programmable units may initiate action. They, rather than host computer 101, may initiate signals that are sent to actuators 108. These programmable units can also send control signals to sensors 107, as for example, to change the orientation of a camera.

Figure 5:
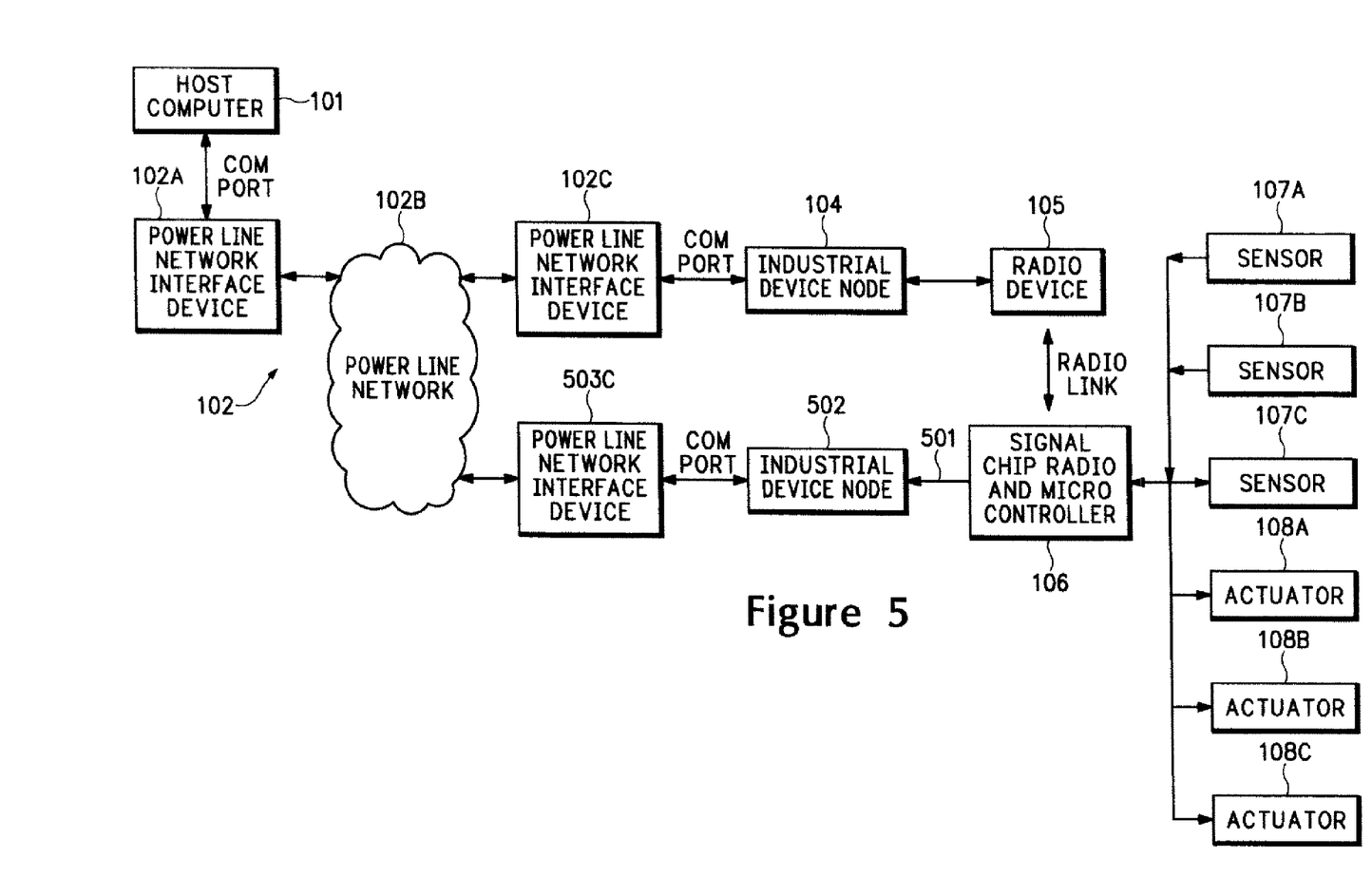
FIG. 5 is a block diagram of an embodiment of a system that connects sensors and actuators to a host computer.

One embodiment of a system that connects a plurality of sensors 107 and actuators 108 to a host computer 101 is shown in FIG. 5. The difference between the first embodiment described above with respect to FIG. 1 and this alternate embodiment is the fact that in this alternate embodiment there is a direct hard wired connection 501 from the single chip radio and micro controller 106 to the a second industrial device node 502. The industrial device node 502 is in turn connected to a power line network interface 503C.

The power line network interface 503C is connected to the power line network 102 in the same manner that power line interface 103C is connected to power line network 102. Thus both industrial device node 104 and industrial device node 502 are connected to the power line network 102, and from there to computer 101.

The programming in single chip receiver 106 in this second embodiment has an added subroutine which detects that the wireless link between radio device 105 and radio 202 is not operating. In this situation signals are sent and received from host computer 101 via the hard wired backup link 501 rather than via the radio link. This backup hard wired link provides added security that the system can remain operational even if some of the links in the system fail to operate for some reason.

It is noted that, as shown in the embodiments described above, the sensors and the actuators are shown as separate units; however, in many systems sensors and actuators are combined in one physical unit. As used herein the term sensor/actuator is used to mean either a sensor or an actuator or a unit that combines both sensor and actuator functions. For example, a heat or fire detector may be combined with an alarm bell, such that when the sensor detects a fire, the alarm bell is sounded and at the same time a signal is sent to the single chip radio micro controller that is connected to the sensor.

A wide variety of sensor/actuator units are commercially available. Many of the commercially available sensors and actuator units provide analog or digital signal outputs and/or can accept analog or digital command signals. The term sensor/actuator as used herein is intended to mean any type of sensor, any type of actuator, or any type of combined sensor and actuator. Any sensor or actuator that provides an analog or digital output signal, and/or a port to receive digital or analog signals, can be used in specific embodiments of the present invention. As a matter of engineering detail, voltage levels may be taken into account and adjusted appropriately.

Figure 6:
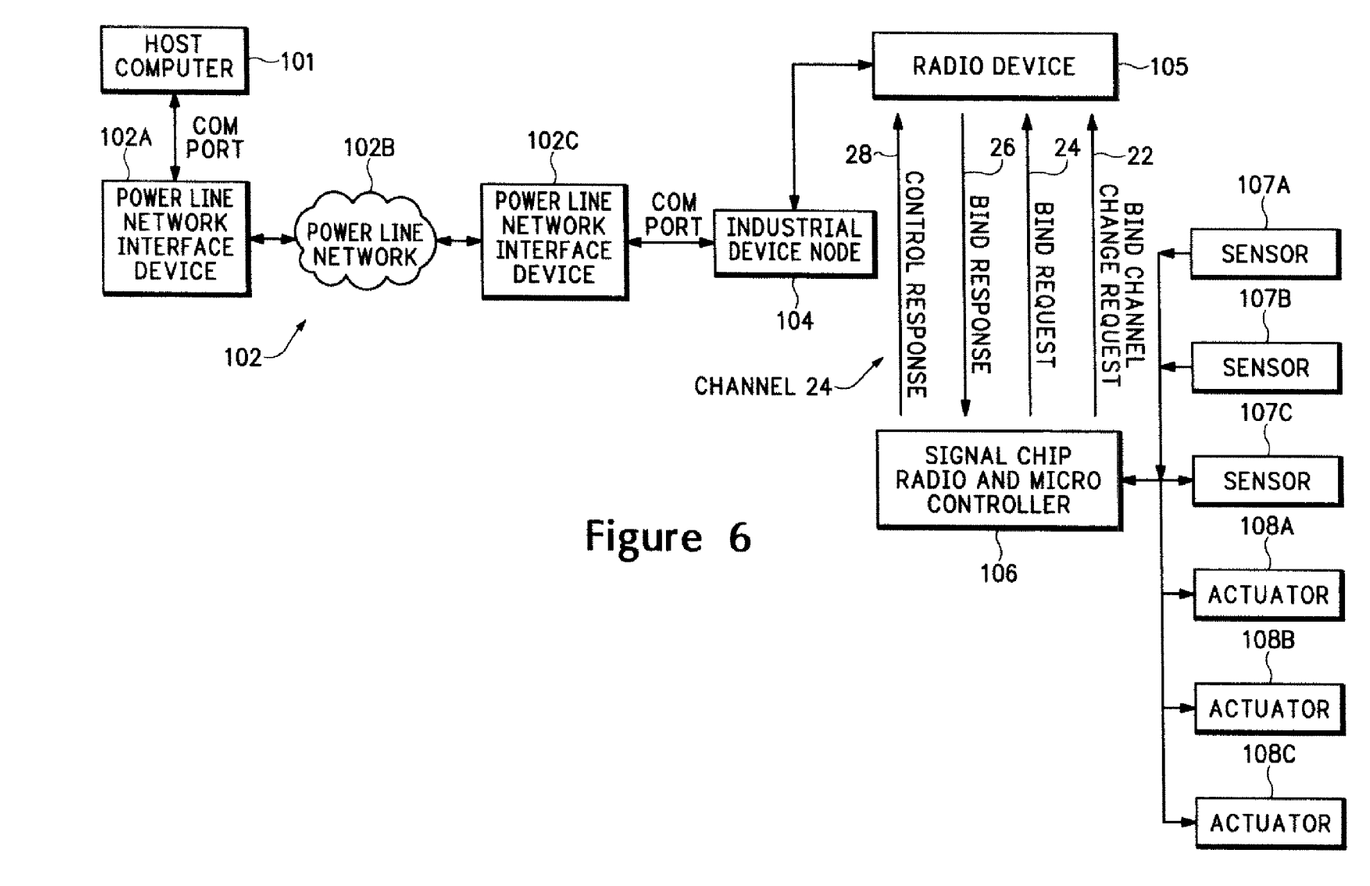
FIG. 6 is a block diagram of a system that performs a binding process according to one embodiment.
Figure 7:
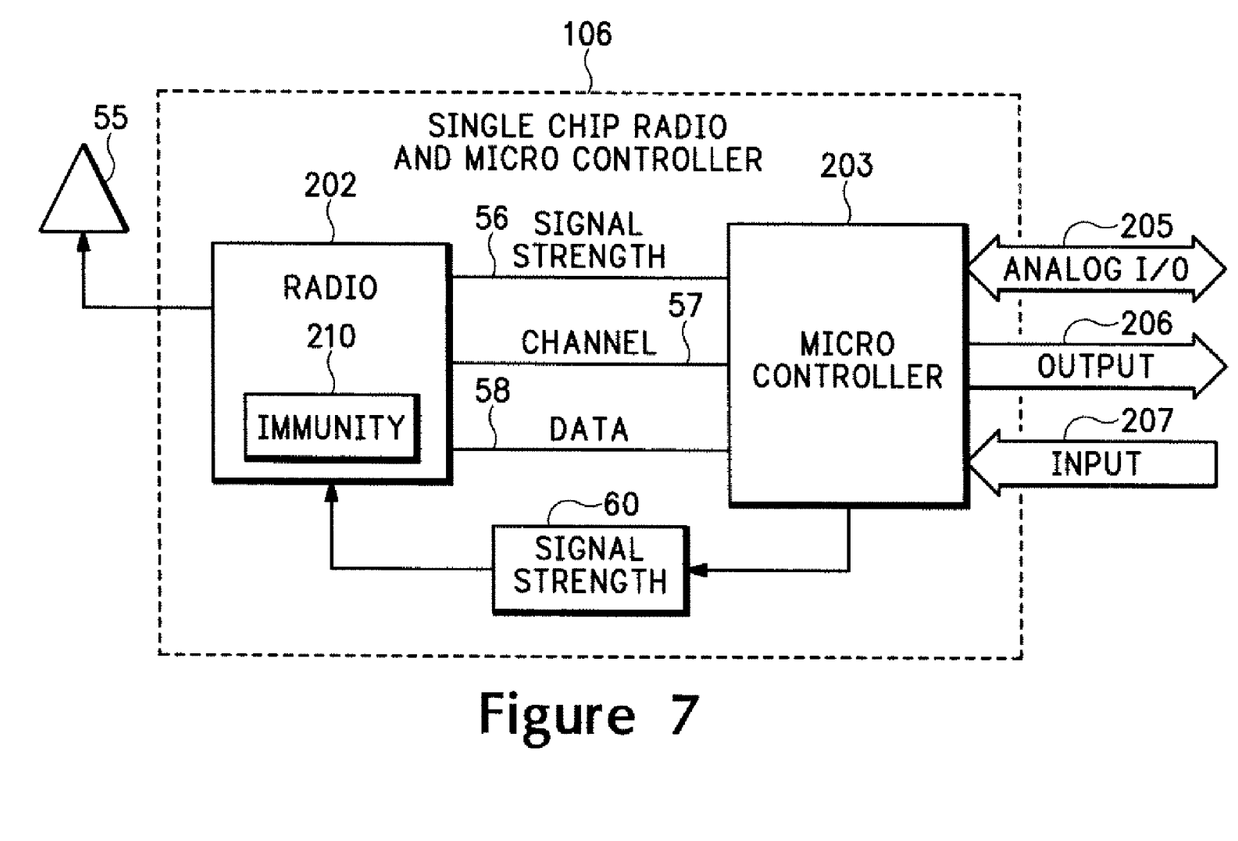
FIG. 7 is a block diagram of an embodiment of a single chip radio and micro controller.

As with the system shown in FIG. 1, the system shown in FIG. 6 is a block diagram of an embodiment of a system that connects a plurality of sensors 107 and actuators 108 to a host computer 101 using the single chip radio and microcontroller 106 and the radio 105. FIG. 7 is a block diagram of the single chip radio and micro controller 106 shown in FIGS. 1 and 6. Like numbers in the figures, particularly FIGS. 1 and 6, refer to like elements, and their attendant descriptions we provide above.

Referring to FIG. 6, the single chip radio and micro controller 106 transmits the data from the sensors 107 and actuators 108 to the radio 105, which then transmits the data to the industrial device node 104. Commands can also be transmitted back to the actuators 108 or to sensors 107 via the radio link between the radio 105 and the single chip radio and micro controller 106.

The host computer 101 and the sensors 107 and the actuators 108, through the single chip radio and micro controller 106, can conduct normal data and message communications over a normal wireless operating range. The normal wireless operating range can refer to a range of distances between the host computer 101 and the single chip radio and micro controller 106 when conducting wireless communications. The normal wireless operating range can also refer to the wireless signal amplification levels or power levels normally used in the single chip radio and micro controller 106 when conducting normal data and message communications.

When the single chip radio and micro controller 106 seeks to be connected to the host computer 101 it can reduce its normal operating range to a reduced binding range. This can occur when the radio and micro controller 106 (or host computer 101) powers up, when the radio and micro controller 106 does not know the identification number of the host computer 101, or when the radio and micro controller 106 (or host computer 101) loses or drops any previously established wireless connection for any reason. Or the single chip radio and micro controller 106 can reduce its operating range from the normal operating range to the reduced binding range when a user presses a button (not shown) located on, e.g., the radio chip and micro controller 106.

The reduced binding range can refer to a reduced narrower range of distances between the radio and micro controller 106 and the host computer 101 or, more particularly to radio 105. For simplicity, we refer to the host computer 101 as the system including the radio 105. The radio and micro controller 106 can be physically located next to the host computer 101 to conduct wireless communications particularly those relating to binding. In an embodiment, the single chip radio and micro controller 106 switches to the reduced binding range by reducing the amplification level of signals transmitted to the host computer 101.

While in the reduced binding range, the single chip radio and micro controller 106 can send a bind channel change request 22 on all channels 24 requesting any host to enter into a pairing or binding mode. All channels 24 can include any channels that the host computer 101 may currently be operating on. Because the radio and micro controller 106 is transmitting at a low power level, the bind channel change request 22 can only be processed by a host computer 101 that is in relatively close proximity to the radio and micro controller 106. The binding handshake exchange, therefore, can be initiated by a user moving the radio and micro controller 106 close to the host computer 101.

In an embodiment, the reduced binding range may be around 6-12 inches or 15-30 centimeters. The reduced binding range reduces the possibility that the single chip radio and micro controller 106 unintentionally binds to the wrong host.

In an embodiment, the host computer 101 can reduce the transmit power level and/or receive sensitivity responsive to the bind channel change request 22.

The host computer 101 and the single chip radio and micro controller 106 enter a pairing or binding mode where each is configured to operate on a particular bind channel. In an embodiment, the bind channel is used for binding operations only. For example, in current spread spectrum wireless systems, this could be channel 78 (not shown) while channels 0-77 (not shown) are used for normal communications. Any predefined channel may suffice. In an embodiment, the bind channel change request 22 can identify the bind channel that the host computer 101 and the single chip radio and micro controller 106 can use for conducting binding operations. The bind channel change request 22 notifies the host computer 101 to change to the bind mode.

During binding operations, the single chip radio and micro controller 106 and the host computer 101 exchange binding messages 24, 26, and 28 successfully if they are in relatively close proximity.

The bind request 24 causes the host computer to send back a bind response 26 that identifies a wireless channel for conducting normal wireless communications. The response 26 can also include an identifier that is used by the single chip radio and micro controller 106 to identify wireless communications from the host computer 101. The single chip radio and micro controller 106 sends a control response 28 back to the host computer 101 that acknowledges the previous bind response 26 and causes both the single chip radio and micro controller 106 and the host computer 101 to revert back to a normal operating mode. In an embodiment, the radio and micro controller 106 may visually and/or audibly notify the user that the binding operations were successfully completed. The visual and/or audible notification can take on any form known to a person of reasonable skill in the art, including lighting light emitting diode (LED) located on the host computer 101 or controlled by the radio 106.

After the binding operation is successfully completed, the host computer 101 and the single chip radio and micro controller 106 switch to the normal wireless operating range to communicate with each other. In an embodiment, the single chip radio and micro controller 106 and the host computer 101 may increase the signal strengths of their transmit and receive signals when operating in the normal wireless operating mode.

In an embodiment, the reduced binding range may be around 6-12 inches or 15-30 centimeters. The reduced binding range reduces the possibility that the single chip radio and micro controller 106 unintentionally binds to the wrong host computer. In an embodiment, the normal operating range is around 10-20 meters. These are only exemplary ranges. The reduced binding and the normal operating ranges can have any range known to a person of skill in the art. The radio 106 and/or host 101 can vary the signal strengths of transmit or receive signals and the corresponding amount of signal strength reduction according to the desired operating parameters of the wireless system.

There is less likelihood that other wireless devices may mistakenly respond to the binding messages when the wireless devices operate in the reduced binding range as we describe above. This allows a user to pair two wireless devices simply by moving the two devices close together. This is a more intuitive method for pairing a peripheral device with a host device, is more user-friendly, and results in lower cost.

Referring to FIG. 7, the single chip radio and micro controller 106 includes a micro controller 203 that controls the operation of a radio 202 as we explain in more detail above. The radio 202 can be any conventional transceiver that transmits and receives wireless signals over any available channel. The single chip radio and micro controller 106 can include the micro controller 203. The micro controller 203 can be a reprogrammable flash type micro controller, or any other type of controller known to a person of skill in the art. A reprogrammable flash type micro controller 203 allows continuous firmware changes and eliminates the need for an external memory, e.g., electrically erasable programmable read only memory (EEPROM), to store binding parameters. A high speed bi-directional connection couples the radio 202 and the controller 203 and is integrated into the single chip. In an embodiment, the high speed bi-directional connection is a SCSI bus.

The micro controller 203 sends data 58 to the radio 202 that is then encoded into wireless signals that the antenna 55 transmits over one of the available wireless channels. Similarly, the radio 202 decodes any signals it receives over the wireless channel into digital data that it sends to the micro controller 203 for additional processing.

The micro controller 203 outputs a signal strength control signal 56 that is used by the radio 202 to adjust the amplification of the transmitted and/or received wireless signals. For example, a lower value is sent on signal strength signal 56 when the micro controller 203 wants the radio 202 to operate in the reduced binding range. The radio 202 then varies the amplification of transmit or receive signals according to the signal 56.

A signal strength controller or monitor 60 can direct the radio 202 to increase or decrease the signal strength of any of the signals transmitted during the binding mode operation. If the host 101 determines that the signal strength of the bind channel change request signal 22 (FIG. 6) or the bind request packet 24 is below a predetermined threshold, the host 101 may ignore the received packet, thereby preventing binding to a wrong device. The normal transmit or received signal strengths and the corresponding amount of signal strength reduction can be varied according to the desired operating parameters of the wireless system.

In an embodiment, the radio 202 transmits wireless signals using a Bluetooth, IEEE 802.11, or some other spread spectrum transmission protocol. It is notable that the reduced binding range can be used with or by any wireless system that performs binding operations.

The micro controller 203 operates the radio 202 in both the normal communications range and the reduced binding range. In an embodiment, the micro controller 203 can automatically operate the radio 202 in the reduced binding range when pairing with a host computer 101 and can operate the radio 202 in the normal communications range after it is successfully paired with the host computer 101.

The micro controller 203 can change between the different channels by varying the channel signal value 57 and controls the sending of the bind channel change request signal 22 on each of the plurality of different wireless channels. The micro controller 203 can also switch the radio 202 to start operating on the bind channel by setting an associated channel value 57. The micro controller 203 can activate a visual indication of successful bind operations by e.g., lighting an associated LED.

The reduced binding range does not require any additional circuitry in the radio 202.

In an embodiment, alternative ways to reduce the effective communication range between the single chip radio and micro controller 202 and the host computer 101 include bypassing the antenna 55. Other hardware could also be used to trigger the radio 106 and the host 101 to enter the pairing mode. In one embodiment, the single chip radio and microcontroller 106 switches to using the reduced binding range when detecting that the host computer 101 is within a threshold proximity. In an embodiment, a proximity switch such as a magnetic reed switch could be used as a trigger to indicate when the single chip radio and micro controller 106 is held close enough to the host computer 101 (and its associated radio 105) for effectively starting and successfully concluding binding. The host computer 101 can include a large magnet that activates the magnetic reed switch when the two devices are within binding range.

The radio 202 can be a transceiver operating at various frequency bands, e.g., the 2.4 GHz ISM (industrial, scientific, and medical) bands. The radio 202 can include interference immunity circuitry 210 to prevent noise from substantially interfering with the wireless communication between the single chip radio and micro controller 106 and radio device 105. The interference immunity circuitry 210 can allow the single chip radio and micro controller 106 to operate well in crowded RF environments. The interference immunity circuitry 210 can include the binding technology described above and in U.S. patent application Ser. No. 11/027,005, filed Dec. 30, 2004, and titled Method and Apparatus for Binding Wireless Devices. The interference immunity circuitry 210 can alternatively use any wireless immunity circuitry known to a person of reasonable skill in the art.

The integration of the radio 202 and the micro controller 203 on a single chip enables a component reduction that adds up to significant savings for wireless PC peripherals. The integration also reduces power consumption extending battery life.

Figure 8:
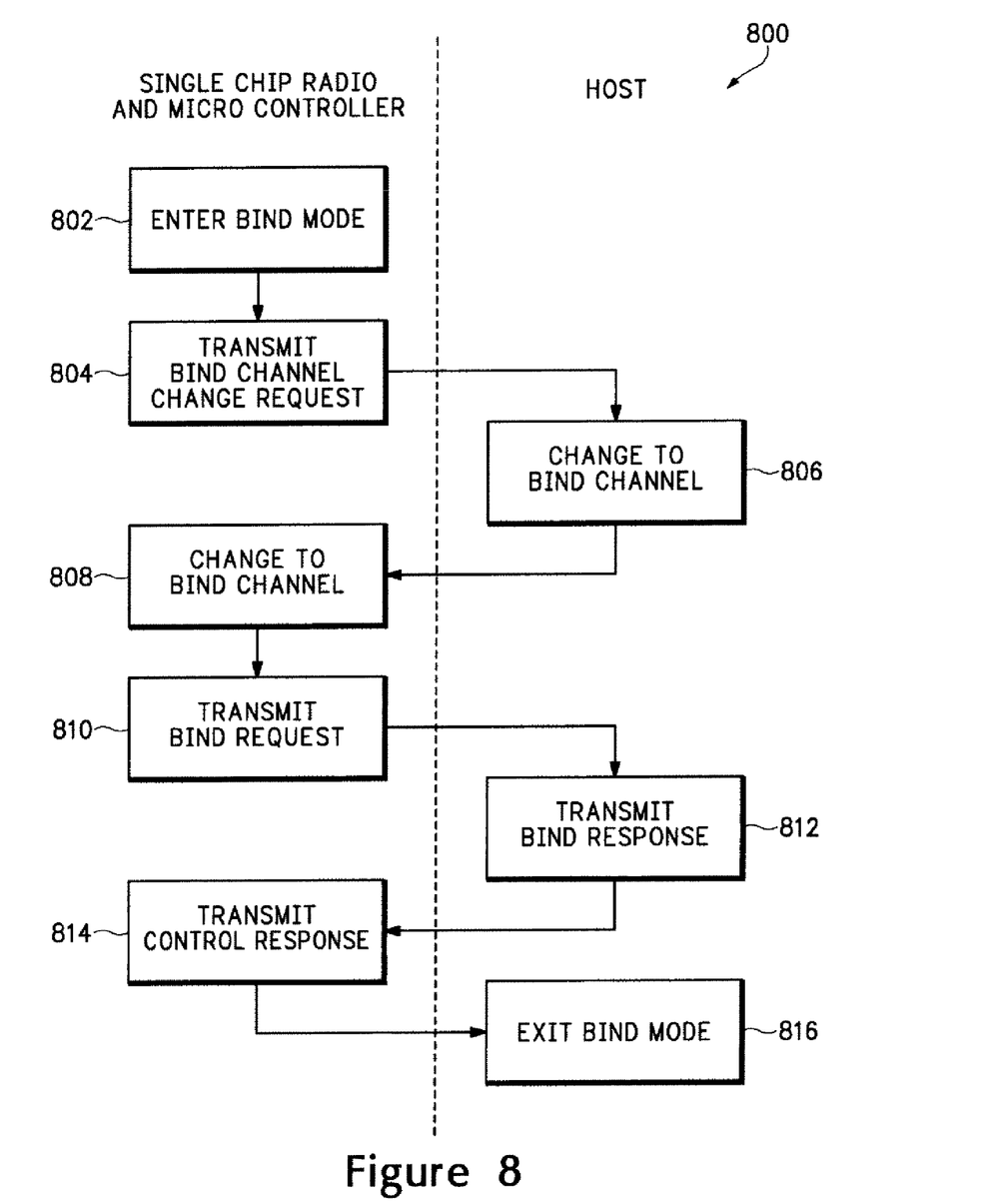
FIG. 8 is a flow diagram of one embodiment of a method associated with the system and single chip radio and micro controller shown in FIGS. 6 and 7, respectively.

FIG. 8 is a flow diagram of a method 800 associated with the system and single chip radio and micro controller shown in FIGS. 6 and 7, respectively. Referring to FIG. 8, the single chip radio and micro controller 106 enters into a bind mode at 802. At initial power up, the single chip radio and micro controller 106 may not have an identification number for the host 101 or operating channel configured for sending wireless communications. Or the wireless connection may be dropped or lost. At 804, the single chip radio and micro controller 203 transmits a bind channel change request 22 on a plurality of channels. The bind channel change request 22 may include a bind channel over which the radio 106 can wireless communicate with the host 101. At 806, the host 101 acknowledges receipt of the bind channel change request 22 by changing to the bind channel. The radio 106 also changes to the bind channel at 808. By doing so, the host 101 and the radio 106 establish a wireless link that allows for the transmission and receipt of messages over the bind channel.

At 810, the single chip radio and micro controller 106 transmits a bind request 24 soliciting a bind response 26 from the host 101. In an embodiment, the host 101 may check the signal strength of the received bind request signal 24 to determine whether to respond. If, for example, the bind request signal 24 is below a predefined threshold, the host 101 may not respond to prevent two host devices, in close proximity, from binding to the same radio 106. If a received signal strength indication (RSSI) level is above the predefined threshold, the host 101 transmits a response 26 to the single chip radio and micro controller 106 at 812. The response 26 identifies to the radio 106, the channel that is going to be used for normal communications and well as providing a host 101 identification number or value. The radio 106, in turn, transmits a control response 28 at 814. The control response 28 acknowledges receipt of the response 26 as well as provides any other control information to the host 101. At 816, the host 101 and the single chip radio and micro controller 106 exit the bind mode and begin operating at the normal wireless communication range using the normal communication channel.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a computer. The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

A wide variety of changes in form and detail can be made in the embodiments without departing from the spirit and scope. The scope of these embodiments is limited only by the appended claims.

We claim:

1. A device, comprising:
   a radio; and
   a controller operatively coupled to the radio to operate the radio in a normal communication range in response to the controller binding the radio to a host in a reducing binding range,
   wherein the controller is configured to automatically switch the radio to operate in the normal communication range without user intervention in response to the controller binding the radio to the host, and
   wherein the radio and the controller are integrated into a single chip.

2. The device of claim 1, wherein the radio is configured to operate in the reduced binding range in response to detecting that the host is within a threshold proximity.

3. The device of claim 1, wherein the controller is configured to cause the radio to transmit a bind channel change request identifying a bind channel on each of a plurality of wireless channels.

4. The device of claim 3, wherein the controller is configured to cause the radio to transmit a bind request in response to the host changing to the bind channel.

5. The device of claim 4, wherein the controller is configured to automatically switch the radio from operating at the reduced binding range to operating at the normal communications range after receiving a bind response to the bind request.

6. The device of claim 5, wherein the controller is configured to cause the radio to transmit a control response in response to the bind response.

7. The device of claim 1, wherein the controller is configured to direct the radio to modify transmit or receive signal strengths in response to the radio operating in the reduced binding range.

8. The device of claim 1, wherein the controller is configured to automatically cause the radio to operate at the reduced binding range in response to detecting a lack of communication from the host during operation of the radio at the normal communications range.

9. A method, comprising:
   operating an integrated circuit chip at a reduced binding range to bind a host computer, wherein the integrated circuit chip includes a controller and a radio;
   automatically switching the integrated circuit chip to operate in a normal communications range without user intervention in response to the integrated circuit chip binding to the host computer; and
   operating the integrated circuit chip to communicate with the host computer at the normal communications range.

10. The method of claim 9, wherein the integrated circuit chip operates at the reduced binding range in response to detecting that the host computer is within a threshold proximity.

11. The method of claim 9, wherein the integrated circuit chip the reduced binding range in response to detecting a lack of communication from the host computer during operation of the integrated circuit chip at the normal communications range.

12. The method of claim 9, further comprising:
   transmitting a bind channel change request on each of a plurality of wireless channels, wherein the bind channel change request identifies a bind channel;
   transmitting a bind request in response to the host computer changing to the bind channel; and
   in response to receiving a bind response, transmitting a control response and switching to a normal communications range.

13. A system, comprising:
   an integrated circuit chip comprising a radio and a controller operatively coupled with the radio,
   wherein the integrated circuit chip is configured to bind with a host computer at a reduced binding range, and communicate with the host computer at a normal communications range, and
   wherein the integrated circuit chip is configured to automatically switch to operate in the normal communications range without user intervention in response to the integrated circuit chip binding to the host computer; and
   the host computer, wherein the host computer is configured to bind with the integrated circuit chip in response to detecting that the integrated circuit chip is within a binding distance from the host computer.

14. The system of claim 13, wherein the integrated circuit chip is configured to operate in the reduced binding range in response to detecting that the host computer is within a threshold proximity.

15. The system of claim 13, wherein the integrated circuit chip is configured to transmit a bind channel change request identifying a bind channel on each of a plurality of wireless channels.

16. The system of claim 15, wherein the integrated circuit chip is configured to transmit a bind request in response to the host computer changing to the bind channel.

17. The system of claim 16, wherein the host computer is configured to transmit a bind response in response to receiving the bind request if the signal strength of the received bind request is above a predefined threshold.

18. The system of claim 17, wherein the integrated circuit chip is further configured to, in response to receiving the bind response from the host computer, switch from operating at the reduced binding range to operating at the normal range, and transmit a control response.

19. The system of claim 13, wherein the integrated circuit chip is configured to begin operating in the reduced binding range by modifying transmit or receive signal strengths of the radio.

20. The system of claim 13, wherein the integrated circuit chip is configured to operate at the reduced binding range in response to a lack of communication from the host computer during operation of the integrated circuit chip at the normal range.

* * * * *